A. E. COLGROVE.
Pot-Lid.

No. 160,163 — Patented Feb. 23, 1875.

WITNESSES
Franck L. Ourand
C. L. Euerk

INVENTOR
A. E. Colgrove
per Alexander Mason
Attorneys

UNITED STATES PATENT OFFICE.

AUSTIN E. COLGROVE, OF ATTICA, INDIANA, ASSIGNOR OF ONE-HALF HIS RIGHT TO ELIJAH YOUNG, OF SAME PLACE.

IMPROVEMENT IN POT-LIDS.

Specification forming part of Letters Patent No. 160,163, dated February 23, 1875; application filed September 5, 1874.

*To all whom it may concern:*

Be it known that I, AUSTIN E. COLGROVE, of Attica, in the county of Fountain and in the State of Indiana, have invented certain new and useful Improvements in Pot-Lids and Strainers; and do hereby declare that the following is a full, clear, and exact description thereof, reference being had to the accompanying drawings, and to the letters of reference marked thereon, making a part of this specification.

The nature of my invention consists in the mode of securing the lid of a pot, as hereinafter more fully set forth.

Figure 1:
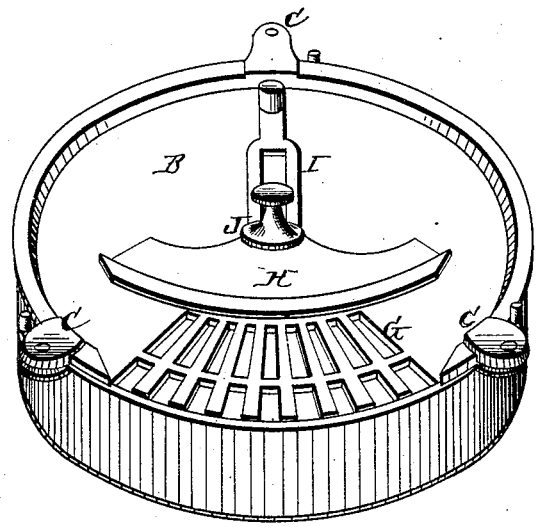
Figure 2:
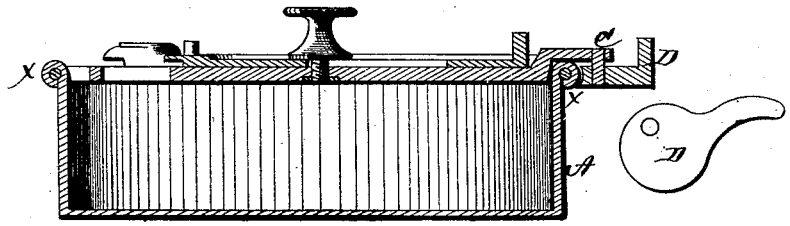

In the accompanying drawings making part of this specification, Figure 1 represents a perspective view of my pot and lid, and Fig. 2 is a cross-section of same.

In the figures, A represents a pot for culinary purposes, which is made of any desired size. This pot is provided at its top with either a square or a rounded flange, $x\ x$. B represents the lid or cover of the pot. This lid is provided with three ears, C, equidistant apart, and projecting over the flange. To these ears are pivoted the cams D, which are provided with little handles for operating same. When the lid is placed on the pot the cams may be turned in one direction, so that they will catch either under or against the flange $x$, and hold said cover snugly in place upon the pot. The cover is provided on one side with a grating, as seen at G, which is made fine enough to prevent the escape of pease or beans or other vegetables when water is to be strained from them. This grating is covered or uncovered by a sliding door, H. This door lies upon the lid, and has an arm, I, which is slotted. A set-screw, J, passes through this slot, and connects the arm to the lid, and adjusts it in any desired position.

When the pot is being used for cooking purposes the door H is made to cover the grating, and is there confined by the set-screw J; but when it is desirable to strain the vegetables being cooked the set-screw is loosened, the door passed back off of the grating, and, the pot being removed, the water is easily poured off.

I do not claim a pot-lid provided with the grating G, having the sliding cover H, as I am aware that such is not new.

Having thus fully described my invention, what I claim as new, and desire to secure by Letters Patent, is—

The combination of the ears C C and cams D D with the cover B and the flanged pot A, all substantially as and for the purposes herein set forth.

In testimony that I claim the foregoing I have hereunto set my hand this 24th day of August, 1874.

AUSTIN E. COLGROVE.

Witnesses:
SAML. L. GRAVES,
CYRUS O. SYLVESTER.